United States Patent Office

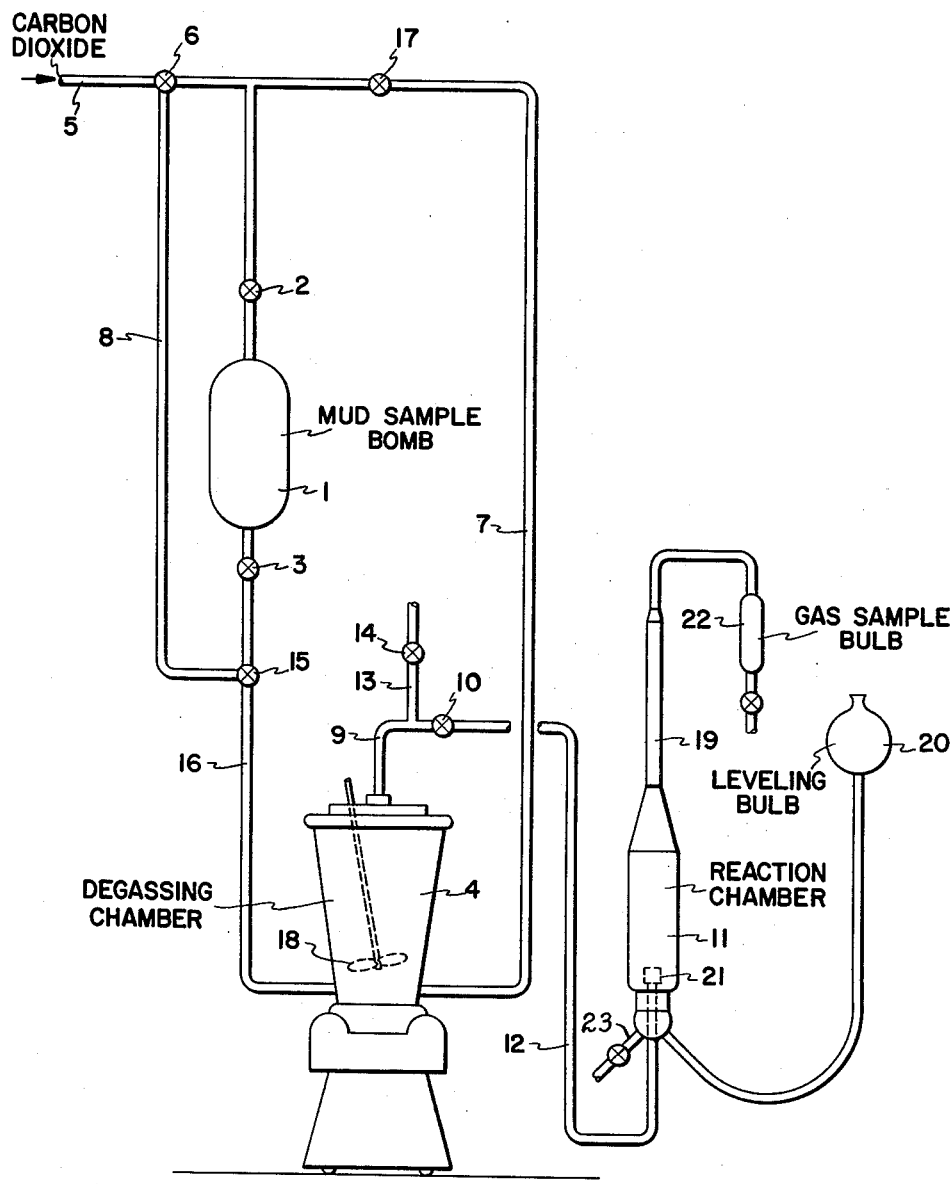

3,118,738
Patented Jan. 21, 1964

3,118,738
QUANTITATIVE DRILLING MUD GAS TRAP
George W. Jamieson, Tulsa, Okla., assignor to Jersey Production Research Company, a corporation of Delaware
Filed Nov. 10, 1960, Ser. No. 68,426
4 Claims. (Cl. 23—253)

The present invention is concerned broadly with an improved well logging technique for determining the presence of oil bearing substrates. The invention is more particularly concerned with the quantitative recovery and measurement of gas present in drilling muds. The invention is particularly concerned with an improved technique and apparatus for the recovery and measurement of a gas in a drilling mud which, in essence, comprises out-gassing the mud in a degassing chamber utilizing carbon dioxide or an equivalent gas. The carbon dioxide is then removed and separated from the gas which is then accurately measured by an improved technique.

In the exploration for oil, it is well known to drill bore holes into the earth's substrata usually utilizing various types of bits which are normally rotated from the surface by means of a pipe string. In the operation, a drilling fluid, usually a clay-water mixture, is pumped down within the pipe string through the bit, which mud flows upwardly in the annular area between the pipe string and the bore hole wall. This drilling fluid among other uses serves to maintain the desired static pressure and to remove the cuttings from the bottom of the bore hole to the surface. During the drilling of the bore hole, various methods of logging the hole are utilized in order to determine the probable presence of oil reservoirs in the vicinity of the bore hole. In essence, "well logging" is an operation wherein characteristic data of the formation penetrated by a bore hole are recorded in terms of depth. Well logging may comprise electrical logs, radioactivity logs, and sonic logs. Another method used is so-called "mud logging," wherein the amount of gas in the mud is determined by various techniques. Mud logging is advantageous in that it is a quick and direct determination of the type of hydrocarbon-bearing formations penetrated by the bit as the formation is being drilled. In mud logging, combustible formation gases are separated from the returned stream of the drilling fluid and are analyzed. Measurements of these gases to determine the kind and relative concentrations of volatile hydrocarbons in the mud when correlated with depths of origin provides a log which, either alone or in combination with other logs, serves as a guide in planning continued drilling and well completion operations.

Thus, various types of "gas traps" are currently being used. However, the gas traps now being used are not entirely satisfactory for producing a satisfactory mud logging guide, since these gas traps do not quantitatively remove the hydrocarbons from the drilling mud. For example, currently being used are so-called "baffle traps" and the like. Other traps being used are various types of agitation traps.

An important part of a drilling mud gas analysis is the trap employed to remove the hydrocarbon gases from the mud. Traps presently in use are based on equilibrium conditions and remove only a portion of the gas from the drilling mud. Depending on the design, the gas removed may vary from a few percent to nearly all of the gas present in a given quantity of drilling mud.

The present invention thus is concerned with an improved technique and apparatus whereby the gas is quantitatively recovered from the oil. The mechanics of hydrocarbon entrainment in the mud stream is that the bit dislodges cuttings from the bottom of the hole which cuttings are picked up by the mud stream and carried to the surface. If the cuttings have porosity and permeability, and if the pores are occupied by compressible fluids such as free gas or solution gas in either oil or water, the reduction in hydrostatic pressure as the cuttings are carried up the hole permits the gas to flow from the cuttings into the mud. At the surface, volatile hydrocarbons in the mud will be evolved, and this evolution may be stimulated by agitation of the mud in a sampling device. Gas from the sampler may then be pumped to a gas detector or analyzer to determine the relative concentration of hydrocarbon components in the sample stream.

The process and apparatus of the present invention may be readily understood by reference to the drawing illustrating an embodiment of the same. As pointed out heretofore, the gas trap of the present invention is quantitative and uses a stream of carbon dioxide to out-gas the drilling mud. The carbon dioxide carrying the removed hydrocarbon gases is transferred to a chamber where the carbon dioxide is removed, preferably by potassium hydroxide and the undissolved hydrocarbon gases are collected. By removing the carbon dioxide from the top of the degassing chamber, all hydrocarbon gases are stripped from the drilling mud.

Referring specifically to the drawing, drilling mud sample bomb 1 is removable from the apparatus and is used to collect a sample of drilling mud from the return mud stream of the well being drilled. Bomb 1 is completely filled with drilling mud and the two gate valves 2 and 3 are closed. The volume of the bomb is calibrated so that a known volume of mud is obtained when the bomb is filled.

The filled bomb is then positioned in the apparatus as illustrated. The apparatus comprises a degassing chamber 4 which is first purged with carbon dioxide introduced by means of line 5 and valve 6 which permits the carbon dioxide to be introduced into the bottom of degassing chamber 4 by means of line 7. Valve 6 does not permit carbon dioxide to flow into line 8 during the purging stage. This gas is withdrawn overhead from chamber 4 by means of line 9 and passes through control valve 10. The gas is introduced into the bottom of chamber 11 by means of line 12 wherein the carbon dioxide reacts preferably with an alkali metal hydroxide such as potassium hydroxide. During the purging operation, under certain conditions, the purging carbon dioxide may be removed from the system by means of line 13 controlled by means of valve 14.

After chamber 4 has been purged, the mud sample is allowed to enter degassing chamber 4 through valves 3 and 15 by means of line 16. Carbon dioxide pressure may be maintained on the top of the mud sample in bomb 1 by properly controlling valves 6, 2, and 17. When the mud is in chamber 4, valve 15 is closed and carbon dioxide is flowed upwardly through bomb 1 by adjusting valve 6 so as to permit carbon dioxide to flow through line 8 upwardly through valve 3 and into bomb 1. This stream is introduced into the bottom of degassing chamber 4 through valve 17 and line 7.

The mud in degassing chamber 4 is then violently agitated by means of a stirrer or vibrating means 18 which rotates at a rapid rate so as to remove entrapped gas from the mud. By violently agitating the mud, the rapidly rotating blades heat the mud thereby increasing the stripping efficiency. During this stage of the degassing operation, carbon dioxide is preferably continually introduced into the bottom of chamber 4 by means of line 7. Gases removed from the mud, as well as the purging gas, are removed overhead by means of line 9, pass through valve 10 and are introduced into the bottom of reaction chamber 11 by means of line 12.

This chamber is filled, including the gas burette 19, with a 50% potassium hydroxide solution. The level of solution is controlled by the leveling bulb 20 or equivalent means. A gas disperser 21 is used in order to introduce the gases into the bottom of chamber 11. This gas disperser 21 creates a great many bubbles, thus creating a very large surface area for the carbon dioxide to react with the potassium hydroxide. Thus, this reaction proceeds rapidly. The released hydrocarbon gases are collected and measured in gas burette 19. The hydrocarbon gas is transferred to sample tube or bulb 22 which may be utilized for transporting these gases to suitable analyzing equipment to determine the nature and other characteristics of the gas.

During the purging operation, the carbon dioxide may be withdrawn from the system by means of line 13 and valve 14. A drain 23 is also provided for the removal of spent reaction mixture or the introduction of fresh mixture into zone 11.

The process and apparatus of the present invention has the advantages in that the hydrocarbon gas removal is quantitative. Also, the apparatus is compact and easily portable, and the hydrocarbon gas sample can be returned to the laboratory in the gas sample bulb, thus eliminating the necessity of taking an analytical instrument, such as a gas chromatograph, into the field. Furthermore, the apparatus is especially suited for mud logging zones of interest in a well. Such zones can be logged with this apparatus thus saving the expense of moving a complete mud logging unit into the well site for only a short interval. Also, a relatively large volume of gas can be removed from the mud by varying the size of the mud sample. Thus, sufficient quantities of gas for detailed analyses, such as carbon isotope studies, can be obtained. While it is preferred that the purging gas comprise carbon dioxide due to its lack of toxicity and lack of corrosiveness, other gases under certain circumstances may be utilized, such as sulfur dioxide or hydrogen chloride to be dissolved in a base or ammonia to be dissolved in an acid. Other bases may be used, such as sodium hydroxide and the like. It is preferred that the concentration of the potassium hydroxide be in the range from about 25% to 64% solution. A preferred solvent comprises a 50% solution.

Thus, in essence, the present invention comprises an improved method and apparatus for the rapid quantitative removal of gases from a drilling fluid and for the collecting and measurement of these gases.

What is claimed is:

1. Apparatus for accurately determining hydrocarbon gases present in a drilling mud which comprises in combination a mud sample bomb, a degassing chamber and a reaction chamber, said mud sample bomb being adapted to secure a typical representative mud sample at the drilling well and thereafter being adapted to be positioned in combination with said degassing chamber and said reaction chamber, a first conduit communicating from a purging gas source to the top of said mud sample bomb and containing a first valve control means therein, a second conduit extending from said first conduit and communicating from said first conduit to the bottom of said mud sample bomb and containing second valve control means therein, a third conduit communicating from said first conduit to the lower area of said degassing chamber and containing valve control means therein, a fourth conduit extending from said second conduit to the lower area of said degassing chamber and containing control valve means therein, a fifth conduit extending from the upper area of said degassing chamber to the lower area of said reaction chamber, measuring means in communication with the upper area of said reaction chamber, whereby gases may be applied through said first conduit to the top of said bomb thereby causing said mud to flow from the bottom of said bomb through said fourth conduit into the bottom of said degassing chamber and whereby after substantially the entire amount of mud has been transferred to said degassing chamber, purging gases may be flowed through said first and second conduit upwardly through said bomb and be withdrawn from the top of said bomb through said third conduit and thereafter pass into the bottom of said degassing chamber and whereby hydrocarbons and purging gas may be removed from the top of said degassing chamber by means of said fifth conduit and pass into said reaction chamber whereby the purging gases are reacted so as to separate hydrocarbons therefrom and whereby said separated hydrocarbons may be measured in said measuring means.

2. Apparatus as defined by claim 1 wherein said degassing chamber contains agitating means.

3. Apparatus as defined by claim 2 wherein said measuring means comprises a leveling bulb and a gas burette.

4. Apparatus as defined by claim 3 wherein a gas sample bulb is in communication with said gas burette, whereby said gases after measurement may be introduced into said gas sample bulb by means of said leveling bulb.

References Cited in the file of this patent

UNITED STATES PATENTS

| | | |
|---|---|---|
| 2,102,282 | Roy | Dec. 14, 1937 |
| 2,355,146 | Carney | Aug. 8, 1944 |
| 2,393,092 | Doan | Jan. 15, 1946 |
| 2,697,651 | Gutzeit | Dec. 21, 1954 |
| 2,974,018 | McNeilly | Mar. 7, 1961 |